Aug. 25, 1931.  D. P. HYNES ET AL  1,820,665
HOOD LATCH
Filed March 26, 1931   3 Sheets-Sheet 3
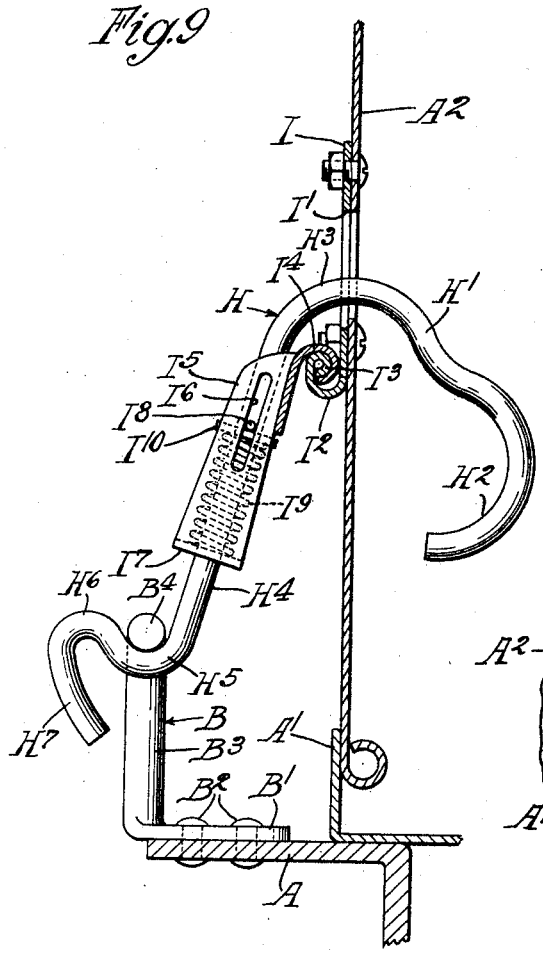
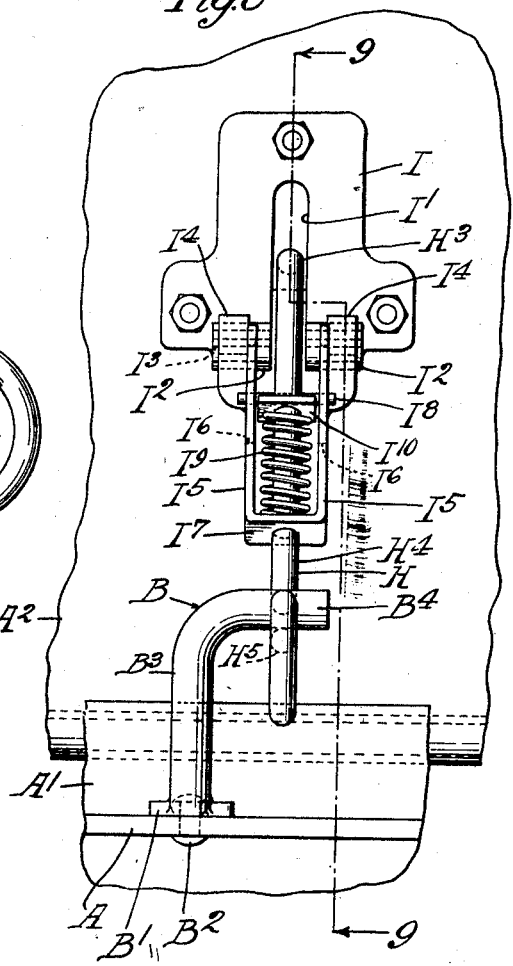
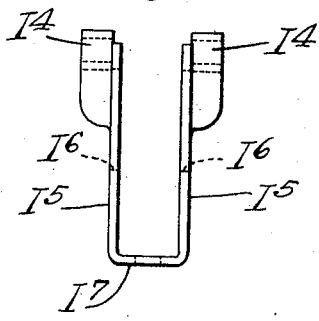
Inventors
Dibrell P. Hynes
Elmer R. Johnson
by Parker & Parker
Attorneys.

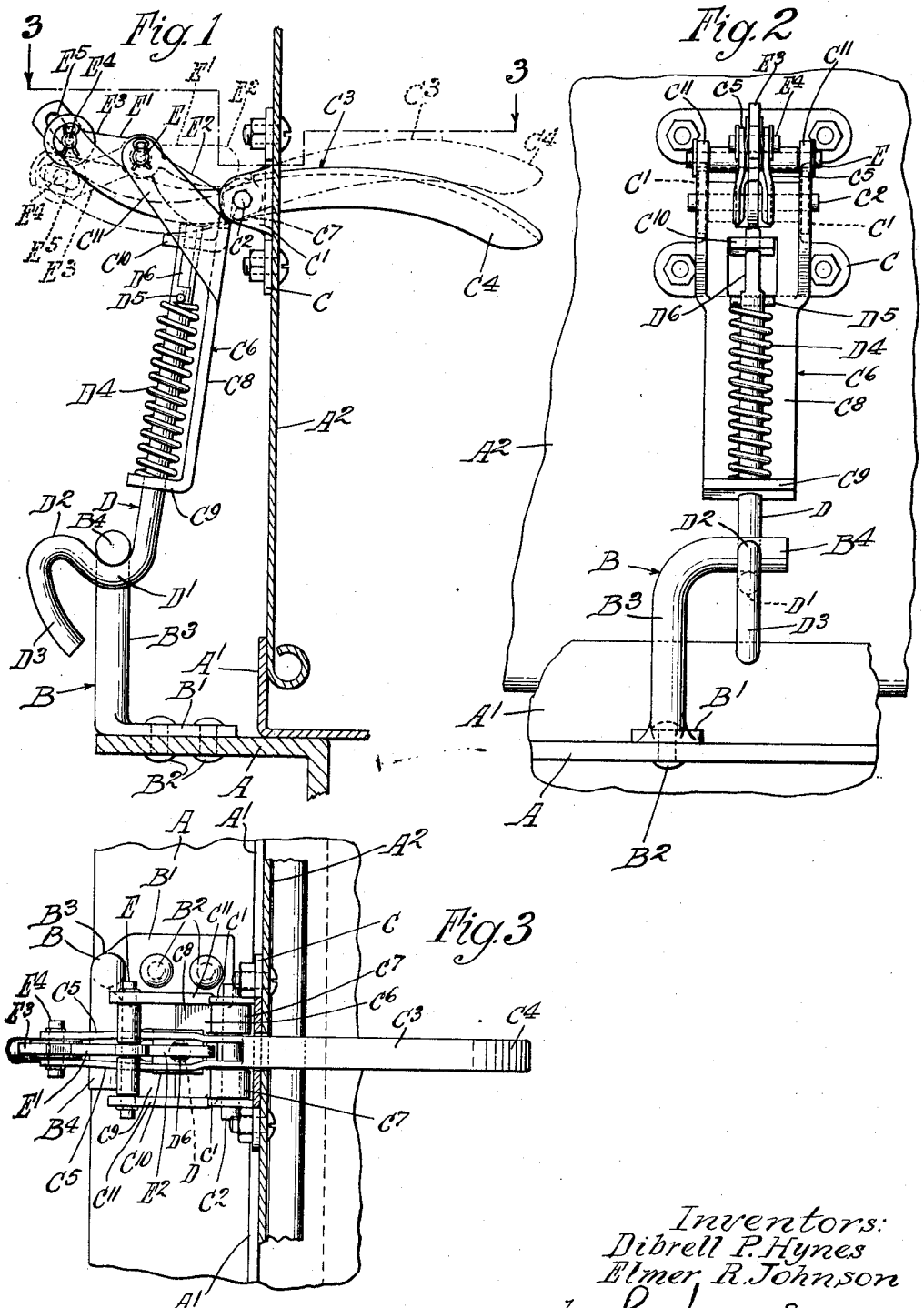

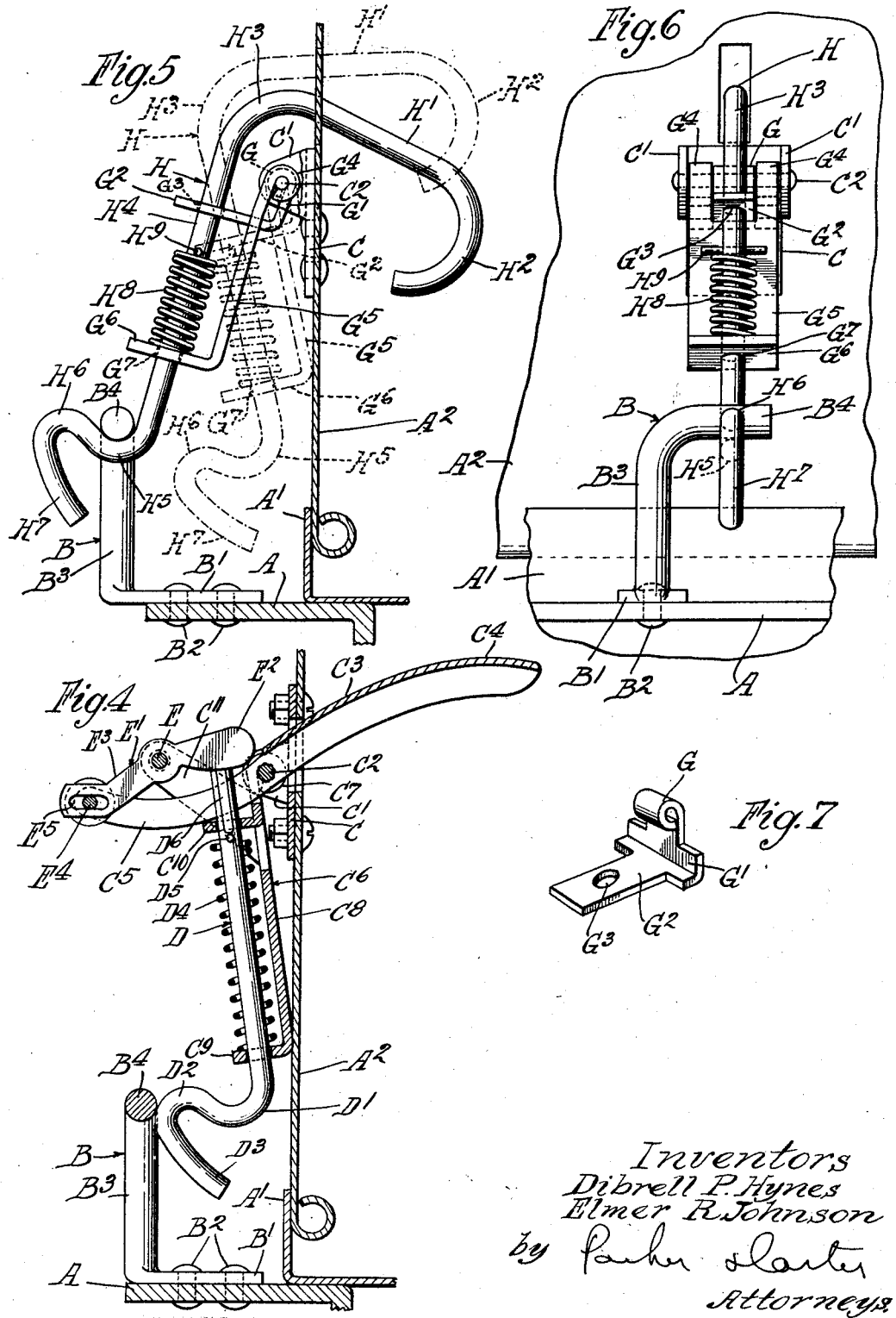

Patented Aug. 25, 1931

1,820,665

UNITED STATES PATENT OFFICE

DIBRELL P. HYNES AND ELMER R. JOHNSON, OF CHICAGO, ILLINOIS, ASSIGNORS TO CHICAGO FORGING & MANUFACTURING CO., OF CHICAGO, ILLINOIS, A CORPORATION OF ILLINOIS

HOOD LATCH

Application filed March 26, 1931. Serial No. 525,466.

Our invention relates to an improvement in securing or latching devices and has for one object the provision of latching or securing means applicable to secure the hood of an automobile. One purpose is to provide such means which shall include an interior latching device and a readily operable exterior handle. Another object is the provision of such a device which shall not only be readily operable, but which shall firmly draw the lower edge of the hood both downwardly and inwardly against any desired abutment or portion of the automobile frame. Another object is the prevention of rattling. Other objects will appear from time to time in the course of the specification and claims.

We illustrate our invention more or less diagrammatically in the accompanying drawings wherein—

Figure 1 is a section through the hood of an automobile illustrating a form of our locking device in side elevation;

Figure 2 is a rear elevation looking outwardly toward the inside face of the hood;

Figure 3 is a section on the line 3—3 of Figure 1;

Figure 4 is a section similar to Figure 1 illustrating the parts in unlocked position;

Figure 5 is a similar section illustrating a variant form of our device;

Figure 6 is an elevation similar to Figure 2 of the form of the device shown in Figure 5;

Figure 7 is a detail;

Figure 8 is a view similar to Figures 2 and 6 of a third form of our device;

Figure 9 is a section on the line 9—9 of Figure 8; and

Figure 10 is a detail.

Referring first to Figures 1 to 4, A generally indicates a portion of the automobile frame and $A^1$ an abutment upwardly projecting therefrom. $A^2$ indicates the side or wall of the automobile hood.

B generally indicates a keeper including the base portion $B^1$ which may be bolted as at $B^2$ to the frame A, the upright portion $B^3$ and the horizontal portion or hook $B^4$ which may actually be engaged by the latch below described.

C indicates any suitable base or plate mounted upon the interior of the hood $A^2$ and provided for example with the ears $C^1$. Passing through said ears is a pivot pin $C^2$ upon which is pivoted a lever $C^3$ which includes an exterior handle $C^4$ and an interior split extension $C^5$. Pivoted to the pin $C^2$ concentrically with said handle is a latch carrier generally indicated as $C^6$ which includes the eyes $C^7$ through which passes the pin $C^2$, the longitudinal extension $C^8$, the bottom apertured flange $C^9$, the top apertured flange $C^{10}$ and the upwardly and inwardly extending arms or ears $C^{11}$.

D indicates the latch member proper which terminates at its lower end in a hook $D^1$, having a nose $D^2$ and a recurved portion $D^3$. It will be understood that the shank of the hook D passes through the members $C^9$ and $C^{10}$. $D^4$ is a spring coiled about the shank of the hook and compressed between the bottom member $C^9$ and the transverse pin $D^5$ passing through the latch. The spring tends to move the latch upwardly, the pin $D^5$ serving as an upper limiting stop. The upper portion of the latch may be flattened at opposite sides as at $D^6$ to permit it to pass readily between the arms of the split portion $C^5$ of the handle lever $C^3$.

E indicates a pivot pin mounted between the ears $C^{11}$. Pivoted for rotation thereabout is the lever $E^1$ which has one arm $E^2$ adapted to contact or abut against the top of the latch D, although it is not mechanically connected thereto. Another arm $E^3$ is pivoted at its outer end to the ends of the arms of the split portion $C^5$ as at $E^4$. It will be noted that the lever arm $E^3$ is slotted as at $E^5$ to compensate for the variation in distance between the pivots E and $E^4$.

In the operation of the device a downward thrust upon the exterior handle portion $C^4$ serves to rotate the lever $E^1$ in clockwise direction and to thrust the latch downwardly against the compression of the spring $D^4$. The downward thrust also tends to rotate the carrier $C^8$ about its pivot and thus to draw the latch into operative engagement with the keeper $B^4$ as soon as it has been moved downwardly sufficiently to permit the nose $D^2$ to clear the keeper. The compression of the spring keeps the parts in locked position. In unlocking the device the operator lifts upwardly upon the exterior handle C⁴ and draws the hook from the keeper against the compression of the spring D⁴. When the hook has been freed a further lifting movement on the handle C⁴ will lift the hood.

Referring to the forms of Figures 5, 6 and 7 a compound latch guiding structure is pivoted for rotation about the pin C². It includes the keeper guide shown in Figure 7 and including the eyes G, the generally vertical portion G¹ depending therefrom, the lateral or horizontal extension G² and the aperture G³. Pivoted concentrically with it to the pivot C² is the lower guide member including the eyes G⁴, the downwardly extended portion G⁵ and the outwardly extending guide member G⁶ apertured as at G⁷.

Slidable through the apertures G³ and G⁷ is the unitary latch and handle member generally indicated as H. It includes the outer handle portion H¹ with an outer loop or bend H² and an interior bend H³ connecting with the longitudinal shank H⁴ of the latch. It in turn terminates at its lower end in a hook H⁵, nose H⁶ and recurved portion H⁷. The spring H⁸, compressed between the member G⁶ and the pin H⁹, tends normally to draw the latch upwardly into locking position.

In operating this form of the latch a downward thrust upon the handle both depresses the latch and swings it inwardly into locking position. Correspondingly an upward lift on the exterior handle H¹ draws the latch against the compression of the spring into unlocking position. A continuation of the lifting movement then serves to lift the hood.

Referring to the form of Figures 8, 9 and 10 substantially the same latch and handle assembly is employed. However, a base plate of somewhat different type is employed generally indicated as I, including the slot or aperture I¹ and the coiled ears I², which are in cross section spirals of sheet metal terminating in the tightly wound portion or bead I³. Interlocking with these bead portions are generally arcuate members I⁴ which serve to support a latch guiding structure, including the side members I⁵ slotted as at I⁶ and connected at their bottom by a transverse member I⁷ to form in effect stirrups. I⁸ indicates a pin equivalent to the pin H⁹ which is guided in the slots I⁶. A spring I⁹ equivalent to springs D⁴, H⁸ is compressed between the stirrup portion I⁷ and the pin I⁸. An abutment plate I¹⁰ may be employed, positioned about or threaded on the latch and thrust upwardly against the pin I⁸ by the spring I⁹.

It will be realized that whereas we have described and claimed a practical and operable device, nevertheless many changes in size, shape and disposition of parts may be employed. We have in fact illustrated three embodiments of our device but do not wish our claims to be specifically limited thereto, except so far as they are necessarily limited by their language.

We claim:

1. In a hood fastener for fastening the movable closure of an automobile hood, a latch member including a shank and a hook, a handle for imparting axial movement to said latch shank and hook, a pivoted guide in which said shank is axially movable, yielding means tending normally to move said shank upwardly in relation to said guide, said guide being pivoted to said hook adjacent the upper end of the latch shank, the hood being apertured to permit the outward extension of the handle therethrough, said aperture and handle being positioned adjacent the level of the pivotal connection between guide and hood.

2. In a hood fastener for fastening the movable closure of an automobile hood, a latch member including a shank and a hook, a stationary keeper within the hood for cooperation with the latch, a handle, extending exteriorly of the hood, in operative relationship with said shank, and a pivot guide in which said shank is axially movable, the upper end of said guide being pivoted to the hood adjacent the level of the handle, the lower end of the guide being free to swing toward and away from the inner face of the hood and a spring, compressed between said guide and shank, tending normally to move said shank axially upwardly along said guide, the entire hood latch assembly, including handle, shank, hook and guide, being adapted to rotate about the pivotal connection between the guide and the hood.

3. In a hood fastener for fastening the movable closure of an automobile hood, the combination with said movable closure of a latch incuding a shank and a hook, a guide for said shank, in which said shank is longitudinally movable, pivoted within the movable closure, the guide, together with the shank and its hook, being free to rotate toward and away from the inner face of the closure, about a common axis, a normally fixed abutment positioned within the closure and adapted to receive the hook, yielding means tending normally to move the shank and hook upwardly along said guide, and an exterior handle, associated with said shank.

4. In a hood fastener for fastening the movable closure of an automobile hood, the combination with said movable closure of a latch including a shank and a hook, a guide for said shank, in which said shank is longitudinally movable, pivoted within the movable closure, the guide, together with the shank and its hook, being free to rotate toward and away from the inner face of the closure, about a common axis, a normally fixed abutment positioned within the closure and adapted to receive the hook, yielding means tending normally to move the shank and hook upwardly along said guide, and an exterior handle integral with said shank.

5. In a hood fastener for fastening the movable closure of an automobile hood, the combination with said movable closure of a latch including a shank, and a hook, a guide for said shank, in which said shank is longitudinally movable, pivoted within the movable closure, the guide, together with the shank and its hook, being free to rotate toward and away from the inner face of the closure, about a common axis, a normally fixed abutment positioned within the closure and adapted to receive the hook, yielding means tending normally to move the shank and hook upwardly along said guide, and an exterior handle, pivoted concentrically with the guide and an operative connection between said handle and the shank.

6. In a hood fastener for fastening the movable closure of an automobile hood, the combination with said movable closure of a latch including a shank, and a hook, a guide for said shank, in which said shank is longitudinally movable, pivoted within the movable closure, the guide, together with the shank and its hook, being free to rotate toward and away from the inner face of the closure, about a common axis, a normally fixed abutment positioned within the closure and adapted to receive the hook, yielding means tending normally to move the shank and hook upwardly along said guide, and an exterior handle, pivoted concentrically with the guide and an operative connection between said handle and the shank, including means for thrusting the shank downwardly along the guide in response to downward movement of the exterior portion of the handle.

7. In a hood fastener for fastening the movable closure of an automobile hood, the combination with said movable closure of a latch including a shank and a hook, a guide for said shank, in which said shank is longitudinally movable, pivoted within the movable closure, the guide, together with the shank and its hook, being free to rotate toward and away from the inner face of the closure, about a common axis, said guide including a plurality of portions adapted to maintain a guiding relationship with the shank, said portions being axially spaced along the shank, a normally fixed abutment positioned within the closure and adapted to receive the hook, yielding means tending normally to move the shank and hook upwardly along said guide, and an exterior handle, associated with said shank.

8. In a hood fastener for fastening the movable closure of an automobile hood, the combination with said movable closure of a latch including a shank and a hook, a guide for said shank, in which said shank is longitudinally movable, pivoted within the movable closure, the guide, together with the shank and its hook, being free to rotate toward and away from the inner face of the closure, about a common axis, said guide including a plurality of portions adapted to maintain a guiding relationship with the shank, said portions being axially spaced along the shank, a normally fixed abutment positioned within the closure and adapted to receive the hook, yielding means tending normally to move the shank and hook upwardly along said guide, and an exterior handle, associated with said shank, the lower of said guiding portions including a transverse plate, associated with the guide, and apertured to permit passage of the shank therethrough, said plate being adapted to serve as the lower abutment for said yielding means.

9. In a hood fastener for fastening the movable closure of an automobile hood, the combination with said movable closure of a latch including a shank and a hook, a guide for said shank, in which said shank is longitudinally movable, pivoted within the movable closure, the guide, together with the shank and its hook, being free to rotate toward and away from the inner face of the closure, about a common axis, said guide including longitudinally spaced apertured plates through which passes the shank, a normally fixed abutment positioned within the closure and adapted to receive the hook, yielding means tending normally to move the shank and hook upwardly along said guide, and an exterior handle, associated with said shank.

10. In a hood fastener for fastening the movable closure of an automobile hood, the combination with said movable closure of a latch including a shank and a hook, a guide for said shank, in which said shank is longitudinally movable, pivoted within the movable closure, the guide, together with the shank and its hook, being free to rotate toward and away from the inner face of the closure, about a common axis, said guide including longitudinally spaced apertured plates through which passes the shank, a normally fixed abutment positioned within the closure and adapted to receive the hook, yielding means tending normally to move the shank and hook upwardly along said guide, and an exterior handle, associated with said shank, a spring surrounding said shank, and a spring abutment on the shank, said spring being compressed between said abutment on the shank and the lower guiding member.

11. In a hood fastener for fastening the movable closure of an automobile hood, the combination with said movable closure of a latch including a shank and a hook, a guide for said shank, in which said shank is longitudinally movable, pivoted within the movable closure, the guide, together with the shank and its hook, being free to rotate toward and away from the inner face of the closure, about a common axis, a normally fixed abutment positioned within the closure and adapted to receive the hook, yielding means tending normally to move the shank and hook upwardly along said guide, and an exterior handle, associated with said shank, and means for moving said shank downwardly in response to downward movement of said exterior handle, including a lever pivoted to the upper portion of said guide and an actuating connection between said handle and said lever.

12. In a hood fastener for fastening the movable closure of an automobile hood, the combination with said movable closure of a latch including a shank and a hook, a guide for said shank, in which said shank is longitudinally movable, pivoted within the movable closure, the guide, together with the shank and its hook, being free to rotate toward and away from the inner face of the closure, about a common axis, a normally fixed abutment positioned within the closure and adapted to receive the hook, yielding means tending normally to move the shank and hook upwardly along said guide, and an exterior handle, associated with said shank, and means for moving said shank downwardly in response to downward movement of said exterior handle, including a lever, pivoted intermediate its ends, upon the upper portion of said guide, one end of said lever being adapted to be opposed to an upper portion of the shank and a pivotal connection between the opposite end of said lever and said handle, the handle extending inwardly through the hood.

13. In a hood fastener for fastening the movable closure of an automobile hood, the combination with said closure of a one piece unitary latch member which includes an interior shank and hook and an exterior handle, and a guide for said shank, in which said shank is longitudinally movable, said guide being pivoted within the movable closure for rotation about an axis adjacent the upper end of the shank.

14. In a hood fastener for fastening the movable closure of an automobile hood, the combination with said movable closure of a latch including a shank and a hook, a guide for said shank, in which said shank is longitudinally movable, pivoted within the movable closure, the guide, together with the shank and its hook, being free to rotate toward and away from the inner face of the closure, about a common axis, said guide including a stirrup the bend of which is apertured to permit the passage therethrough of the shank, and a cross head, associated with the shank, in guiding relation with an upper portion of the stirrup, a normally fixed abutment positioned within the closure and adapted to receive the hook, yielding means tending normally to move the shank and hook upwardly along said guide, and an exterior handle, associated with said shank.

Signed at Chicago, Illinois, this 24th day of March, 1931.

DIBRELL P. HYNES.
ELMER R. JOHNSON.